(12) United States Patent
Jang et al.

(10) Patent No.: US 11,936,318 B2
(45) Date of Patent: Mar. 19, 2024

(54) CHARGING SYSTEM AND METHOD USING MOTOR DRIVING SYSTEM

(71) Applicants: Hyundai Motor Company, Seoul (KR); Kia Corporation, Seoul (KR)

(72) Inventors: Ji Woong Jang, Gwangmyeong-si (KR); Sang Cheol Shin, Suwon-si (KR); Yoo Jong Lee, Osan-si (KR); Ki Jong Lee, Hwaseong-si (KR); Ho Tae Chun, Asan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 7 days.

(21) Appl. No.: 17/829,762

(22) Filed: Jun. 1, 2022

(65) Prior Publication Data
US 2023/0006596 A1   Jan. 5, 2023

(30) Foreign Application Priority Data
Jun. 30, 2021   (KR) .......................... 10-2021-0085504

(51) Int. Cl.
*H02P 1/54*   (2006.01)
*B60L 15/00*   (2006.01)
(Continued)

(52) U.S. Cl.
CPC ............ *H02P 27/08* (2013.01); *B60L 15/007* (2013.01); *B60L 50/66* (2019.02); *B60L 53/24* (2019.02);
(Continued)

(58) Field of Classification Search
CPC ...... H02P 27/08; H02P 21/0021; H02P 27/06; B60L 50/66; B60L 53/24; B60L 15/007;
(Continued)

(56) References Cited

U.S. PATENT DOCUMENTS

2009/0184681 A1   7/2009   Kuno
2013/0147431 A1*  6/2013   Lim ........................ B60L 50/61
                                                    320/109
2020/0282862 A1   9/2020   Handa et al.

FOREIGN PATENT DOCUMENTS

JP            5397203 B2    1/2014
KR       10-2009510 B1    8/2019
(Continued)

OTHER PUBLICATIONS

Extended European Search Report dated Nov. 18, 2022, issued in corresponding European Patent Application No. 22177894.7.

*Primary Examiner* — Karen Masih
(74) *Attorney, Agent, or Firm* — Morgan, Lewis & Bockius LLP (57) ABSTRACT

Charging system and method using a motor driving system are proposed. The charging system includes a battery, an inverter to which D.C. power stored in the battery is applied, including a plurality of legs each including two switching elements, a motor including a plurality of coils of which first ends are respectively connected to connection nodes of the switching elements of each of the plurality of legs, and second ends are connected to each other to form a neutral point, and an inverter driving part configured to control switching of the switching elements, so that switching speeds of the switching elements are different for each mode of a motor driving mode and a charging mode so as to change magnitude of charging voltage supplied to the neutral point of the motor and to output the charging voltage to the battery.

12 Claims, 6 Drawing Sheets

(51) Int. Cl.
      *B60L 50/60*         (2019.01)
      *B60L 53/24*         (2019.01)
      *H02J 7/00*          (2006.01)
      *H02J 7/24*          (2006.01)
      *H02M 1/088*        (2006.01)
      *H02M 7/5387*       (2007.01)
      *H02P 27/08*        (2006.01)

(52) U.S. Cl.
      CPC .......... *H02J 7/0047* (2013.01); *H02J 7/2434* (2020.01); *H02M 1/088* (2013.01); *H02M 7/53871* (2013.01); *B60L 2210/40* (2013.01); *H02J 2207/20* (2020.01)

(58) Field of Classification Search
      CPC . B60L 2210/40; H02J 2207/20; H02J 7/2434; H02J 7/0047; H02M 1/088; H02M 7/53871
      See application file for complete search history.

(56) References Cited

FOREIGN PATENT DOCUMENTS

| | | |
|---|---|---|
| KR | 10-2019-0119778 A | 10/2019 |
| KR | 10-2020-0068175 A | 6/2020 |
| KR | 10-2020-0075937 A | 6/2020 |
| KR | 10-2020-0116580 A | 10/2020 |

\* cited by examiner

CHARGING SYSTEM AND METHOD USING MOTOR DRIVING SYSTEM

CROSS REFERENCE TO RELATED APPLICATION

The present application claims priority to Korean Patent Application No. 10-2021-0085504, filed Jun. 30, 2021, the entire contents of which is incorporated herein for all purposes by this reference.

TECHNICAL FIELD

The present disclosure relates to a charging system and a method using a motor driving system and, more particularly, to a vehicle battery charging system and a method using a motor driving system, the vehicle battery charging system and method being capable of charging a battery by receiving external charging power at a neutral point of a motor and by controlling switching elements of an inverter provided for motor driving, and thus being capable of solving a problem caused by noise generated due to high-speed switching of the switching elements.

BACKGROUND

In general, an electric vehicle or a plug-in hybrid vehicle is configured to charge a battery by converting power supplied from external charging equipment into a proper state suitable for charging the vehicle battery, and to supply the power to the battery.

For example, conventional high-speed charging equipment is built to output a single voltage standard of 400V. However, the battery used in the vehicle tends to be designed to have a voltage of 800V or higher in order to improve electrical efficiency, mileage, etc. The high-speed charging equipment supplies the charging voltage of 400V to the vehicle, but the vehicle battery has a voltage standard of 800V or higher. Therefore, a boost converter for boosting a voltage supplied from the external charging equipment is required in order to charge the battery.

However, the boost converter with large capacity for boosting the voltage of 400V into the voltage of 800V or higher is heavy and bulky, and a cost thereof is expensive, so it is difficult to provide the boost converter in the vehicle and the boost converter may cause the price of the vehicle to rise.

Accordingly, as a new charging technology that can receive a voltage of charging equipment that provides the charging voltage with a relatively low voltage established with an existing infrastructure and boost the low voltage to a high voltage without an additional device and additional cost increase, and then can provide the voltage to the battery, the technical field of the present disclosure proposes a new technology for charging the battery by converting the external charging power provided at a neutral point of a motor using an inverter and then providing the power to the battery.

The technology, which provides the charging power to the battery using the neutral point of the motor proposed in the related art, controls switching elements of the inverter for driving the motor and boosts the external charging voltage supplied at the neutral point of the motor so as to supply the charging power to the battery, whereby charging of the battery of 800V is possible by using the charging equipment of 400V.

As described above, the charging system supplying the charging power to the battery using the neutral point of the motor generates a desired size of the charging voltage by switching the switching elements in the inverter. Noise generated in a process of high-speed switching of the switching elements causes disrupts communication between the vehicle and the charging equipment (mainly, power line communication (PLC)), causing problems such as interruption of charging.

The foregoing is intended merely to aid in the understanding of the background of the present disclosure, and is not intended to mean that the present disclosure falls within the purview of the related art that is already known to those skilled in the art.

SUMMARY OF THE DISCLOSURE

Accordingly, the present disclosure has been made keeping in mind the above problem occurring in the related art, and the present disclosure is intended to provide charging system and method using a motor driving system, which are configured to minimize an effect of noise due to switching on communication with charging equipment by reducing switching speed of switching elements in a charging process, in which an external charging voltage supplied at a neutral point of a motor is boosted using the switching elements of an inverter and then is supplied to a vehicle battery by using the motor driving system for motor driving.

In order to achieve the above objective, according to one aspect of the present disclosure, there is provided a charging system using a motor driving system, the charging system including: a battery; an inverter to which D.C. power stored in the battery may be applied, the inverter including a plurality of legs each including two switching elements connected to each other in series; a motor including a plurality of coils of which first ends may be respectively connected to connection nodes of the switching elements included in each of the plurality of legs, and second ends may be connected to each other to form a neutral point; and an inverter driving part configured to control switching of the switching elements to provide different switching speeds of the switching elements for a motor driving mode operated for controlling the switching elements in the inverter for driving the motor and a charging mode operated for controlling the switching elements in the inverter so as to change magnitude of charging voltage supplied to the neutral point of the motor and to output the charging voltage to the battery.

The inverter driving part may be configured to determine that the switching speeds of the switching elements in the charging mode may be slower than the switching speeds of the switching elements in the motor driving mode.

Each of the switching elements may be a switching element comprising a gate to which a driving signal that determines the switching may be applied, and the inverter driving part may be configured to determine magnitude of a gate resistance applied to the gate differently for each of the charging mode and the motor driving mode.

The inverter driving part includes: a controller configured to generate a mode signal representing one of the charging mode and the motor driving mode and a pulse width modulation signal for controlling the switching of the switching elements; a first gate driving circuit configured to output a signal corresponding to the pulse width modulation signal in the motor driving mode; a second gate driving circuit configured to output a signal corresponding to the pulse width modulation signal in the charging mode; a first gate resistor connected to a portion between an output terminal of the first gate driving circuit and the gate; and a second gate resistor connected to a portion between an output terminal of the second gate driving circuit and the gate, and having a resistance value larger than a resistance value of the first gate resistor.

The first gate driving circuit may include a first switch configured to transmit or block the pulse width modulation signal on the basis of the mode signal, and a first transformer providing insulation between the first switch and the first gate resistor, the second gate driving circuit may include a second switch configured to transmit or block the pulse width modulation signal on the basis of the mode signal, and a second transformer providing insulation between the second switch and the second gate resistor, and the first switch and the second switch may be operated to be complementary to each other.

The first switch may be a P-MOSFET and the second switch is an N-MOSFET, or the first switch may be an N-MOSFWT and the second switch may be the P-MOSFET.

The first gate driving circuit may include a first OR element configured to receive one of the mode signal and an inversion signal of the mode signal and to receive the pulse width modulation signal, and a first transformer providing insulation between the first OR element and the first gate resistor, the second gate driving circuit may include a second OR element configured to receive one of the mode signal and the inversion signal of the mode signal and to receive the pulse width modulation signal, and a second transformer providing insulation between the second OR element and the second gate resistor, and one of the first gate driving circuit and the second gate driving circuit may include an inversion element inverting the mode signal.

The controller may be configured to receive vehicle driving condition information indicating whether a vehicle is in the motor driving mode or the charging mode to generate the mode signal for representing the charging mode or the motor driving mode.

The present disclosure may provide a charging method using a motor driving system, the charging method including: determining, by a controller, an operation mode as one of a motor driving mode and a charging mode, the motor driving mode being operated for driving a motor by controlling switching elements in an inverter to change D.C. voltage into A.C. voltage and supplying the A.C. voltage to the motor, and the charging mode being operated for charging a battery by controlling the switching elements in the inverter to change magnitude of charging voltage supplied to a neutral point of the motor and to output the charging voltage to the battery connected to the inverter; generating, by the controller, a pulse width modulation signal provided for controlling the switching elements; and adjusting, by the controller, in a gate driving circuit, an ascending inclination and a descending inclination of the pulse width modulation signal generated in response to the determined operation mode, generating a gate signal, and providing the gate signal to gates of the switching elements.

The inverter, to which D.C. power stored in the battery is applied, may include a plurality of legs each comprising two switching elements connected to each other in series; the motor may include a plurality of coils of which first ends may be respectively connected to connection nodes of the switching elements included in each of the plurality of legs, and second ends may be connected to each other to form the neutral point; and in the motor driving mode, the D.C. power may be changed into A.C. power of a plurality of phases by switching of the switching elements, and the A.C. power may be supplied to the motor, and in the charging mode, the charging voltage supplied to the neutral point of the motor may be boosted by a boost converter including one of the coils of the motor and the two switching elements in one leg connected to the one coil, and then is supplied to the battery.

In the providing the gate signal, an inverter driving part may determine that an absolute value of an ascending inclination and a descending inclination of the gate signal in the charging mode may be less than an absolute value of the ascending inclination and the descending inclination of the gate signal in the motor driving mode.

In the providing the gate signal, an inverter driving part may determine magnitude of a gate resistance applied to the gate differently for each of the charging mode and the motor driving mode.

The method may further include receiving, by the controller, vehicle driving condition information indicating whether a vehicle is in the motor driving mode or the charging mode so that the controller may generate the mode signal for representing the charging mode or the motor driving mode.

According to the charging system and method using the motor driving system, the charging system using the motor driving system can minimize switching loss by increasing switching speed of the switching elements in the inverter during the motor driving, and can reduce the noise generated due to the switching by reducing the switching speed of the switching elements in the inverter during the charging.

Therefore, according to the charging system and method using the motor driving system, during the charging, an adverse effect of noise on communication achieved between the vehicle and the charging equipment through the PLC can be eliminated, and efficient charging can be achieved.

Effects of the present disclosure are not limited to the above-mentioned effects, and those skilled in the art will clearly understand other effects not mentioned in consideration of a following description.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE DISCLOSURE

Hereinbelow, a circuit diagram of a charging system using a motor driving system according to various embodiments will be shown with reference to accompanying drawings.

Figure 1:
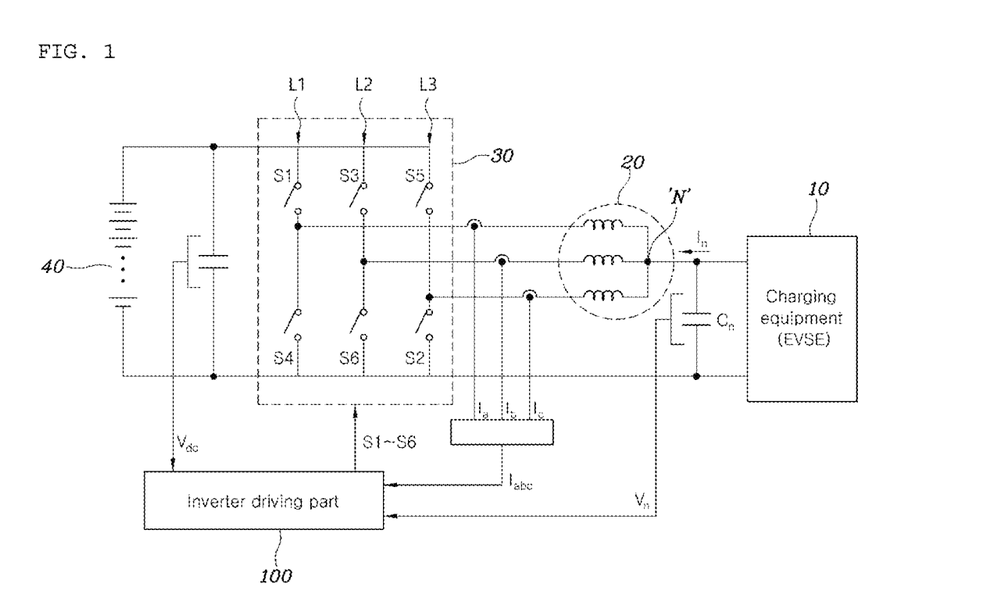
FIG. 1 is a circuit diagram of a charging system using a motor driving system according to an embodiment of the present disclosure.

FIG. 1 is a circuit diagram of a charging system using a motor driving system according to an embodiment of the present disclosure.

Referring to FIG. 1, the charging system according to an embodiment of the present disclosure is a system for charging a battery 40, i.e., an energy storage device, through a system provided for driving a motor 20.

In general, the system for driving the motor 20 may include the battery 40 that is the energy storage device for storing electric power for driving the motor 20, and an inverter 30 converting the D.C. power stored in the battery 40 into three-phase A.C. power and supply the power to the motor 20. The inverter 30 has three legs connected to opposite ends of the battery 40 while the three legs are in parallel to each other. Each of the legs L1 to L3 has two switching elements (two of S1 to S6) that are connected to each other in series. Driving power is supplied from a connection node of the switching elements to the motor 20. As described above, an energy flow for driving the motor 20 flows in a direction from the battery 40 toward the motor 20.

In the connection structure of the inverter 30 for driving the motor 20 as described above, when the energy flow flows in the direction from a neutral point of the motor 20 toward the battery 40, one of the three-phase coils in the motor 20 and two of the switching elements S1 to S6 in one leg in the inverter 30 connected to the one coil may constitute a single boost circuit.

As an example, the uppermost coil in the motor 20 in FIG. 1 and two switching elements S1 and S4 included in the leftmost leg of the inverter 30 may provide the single boost circuit when the energy flow in the direction from the neutral point N of the motor toward the battery is generated.

When the motor 20 is a three-phase motor having three phases, with the three-phase motor and a three-phase inverter, a circuit in which total three boost circuits are connected to portions between the neutral point N of the motor 20 and the battery 40 in parallel to each other may be configured.

In various embodiments of the present disclosure, the external charging power supplied from an external charging equipment 10 (i.e., electric vehicle supply equipment (EVSE)) to the neutral point N of the motor 20 is supplied via each of the legs respectively corresponding to each phase of the inverter 30. The charging power is boosted by controlling the switching elements of each of the legs and then is supplied to the battery 40, thereby achieving charging of the battery 40.

In the various embodiments of the present disclosure, a motor-side connection terminal of the inverter 30 is provided as an input terminal of the inverter 30, and a battery-side connection terminal of the inverter 30 may serve as an output terminal of the inverter 30.

According to the embodiment of the present disclosure, the charging system using a motor driving system is a charging system using a motor driving system, the charging system including the battery 40, the inverter 30 receiving the D.C. power stored in the battery 40 during driving of the motor and converting the D.C. power into three-phase A.C. power and outputting the A.C. power to the motor 20, the motor 20 generating a rotation force using the three-phase A.C. power output from the inverter 30. The charging system may include an inverter driving part 100, the inverter driving part 100 being configured to, when the motor 20 is driven, control the inverter 30 to generate phase voltage and phase current of the motor 20 by switching the switching elements in the inverter 30, and when the battery 40 is charged, control the inverter 30 to determine duty of the switching elements in the inverter 30 to boost the level of the charging voltage supplied to the neutral point of the motor 20 and output the charging voltage to the battery 40.

Figure 2:
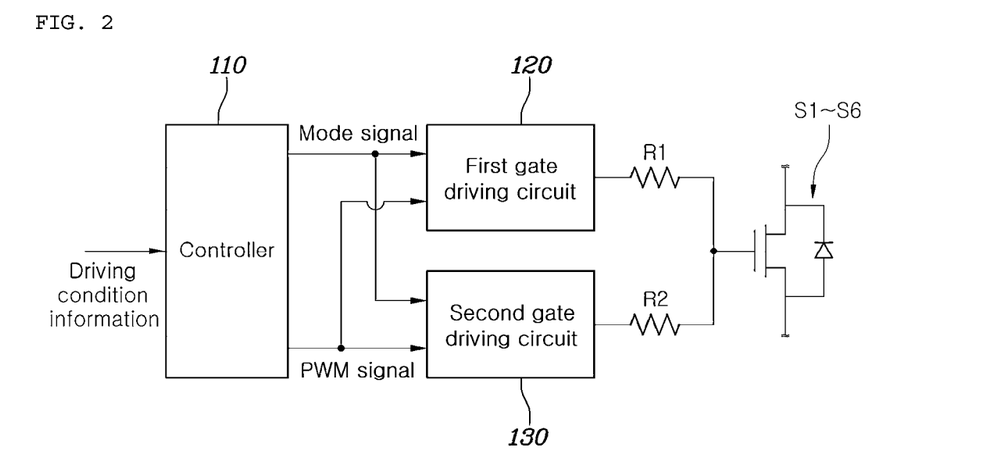
FIG. 2 is a block diagram showing an example of an inverter driving part of the charging system using a motor driving system according to the embodiment of the present disclosure in detail.

FIG. 2 is a block diagram showing an example of an inverter driving part of the charging system using a motor driving system according to the embodiment of the present disclosure in detail.

Referring to FIG. 2, according to the embodiment of the present disclosure, the inverter driving part 100 of the charging system using a motor driving system may include a controller 110 receiving vehicle driving condition information from a host controller, etc. and generating a system operation mode signal based on the vehicle driving condition information and a pulse width modulation (PWM) signal for controlling switching of the switching elements S1 to S6 in the inverter 30, a first gate driving circuit 120 and a second gate driving circuit 130 transmitting or blocking the PWM signal on the basis of the mode signal output from the controller 110, and a gate resistor R1, R2 connected to a portion between an output terminal of each the first gate driving circuit 120 and the second gate driving circuit 130 and a gate terminal of the switching elements S1 to S6 of the inverter 30.

The switching elements constituting the inverter 30 may be realized with an insulated gate bipolar transistor (IGBT), a field effect transistor (FET), or the like. Recently, the FET implemented with a SiC with high switching speed and small losses is widely used as the switching element.

As described above, when the switching of the switching elements becomes rapid, a large conductive noise is generated. Due to higher switching speed, higher current variability or higher voltage variability, a parasitic inductance and a parasitic capacitance constituting the vehicle battery charging system react to cause more noise.

The noise has an adverse effect on the PLC performed between the vehicle battery charging system and the external charging equipment, resulting an error on communication. Therefore, there may be problem in that the charging is interrupted.

In order to solve the problem of charging interruption due to the noise, a method of reducing the switching speed may be considered. However, the slower the switching speed, the greater the switching losses of the switching elements, and therefore, fuel efficiency during motor driving deteriorates and mileage may be reduced.

According to the various embodiments of the present disclosure, in order to solve trade-off in response to increasing and decreasing of the switching speeds of the switching elements, in the battery charging and the motor driving, the switching elements are operated by determining the switching speeds of the switching elements differently from each other.

As shown in FIG. 2, the controller 110 of the inverter driving part 100 receives the vehicle driving condition information including information whether a vehicle is in the charging state or the motor driving state, from the host controller. The controller 110 outputs the mode signal corresponding to the vehicle driving condition information and outputs a PWM signal that determines a gate switching state of the inverter 30.

The first gate driving circuit 120 and the second gate driving circuit 130 of the inverter driving part 100 respectively output a gate driving signal corresponding to the PWM signal input on the basis of the mode signal to the output terminals thereof. The first gate driving circuit 120 and the second gate driving circuit 130 transmit the gate driving signal to the switching elements S1 to S6 through one of the gate resistors R1 and R2 connected to the output terminals of the first gate driving circuit 120 and the second gate driving circuit 130, so that the switching elements S1 to S6 may be switched into ON/OFF.

The first gate driving circuit 120 may have the output terminal (INV PWM OUT) outputting a gate driving signal used in the motor driving mode. The second gate driving circuit 130 may have the output terminal (charging PWM OUT) outputting a gate driving signal used in the charging mode.

The switching speeds of the switching elements formed of the SiC may be determined by a gate voltage and a gate resistance. The switching speeds of the SiC switching elements may be determined by a gate current for charging the capacitance between a gate and a source of the switching elements. The gate current may be determined as a value obtained by dividing the gate voltage by the gate resistance. Therefore, the lower the gate resistance, the greater the gate current, so the switching becomes rapid. In addition, the higher the gate resistance, the smaller the gate current, so the switching becomes slow. As magnitude of the gate resistance is adjusted, the switching speed may be adjusted.

The resistor R1 connected to the output terminal of the first gate driving circuit 120 outputting the gate driving signal in the motor driving mode realizes a high switching speed by setting a resistance value thereof, so that the efficiency of the motor driving may increase to optimize the fuel efficiency. The resistor R2 connected to the output terminal of the second gate driving circuit 130 outputting the gate driving signal in the charging mode lowers the switching speed by setting the resistance value thereof larger, so that the noise occurrence may be minimized.

Figure 3:
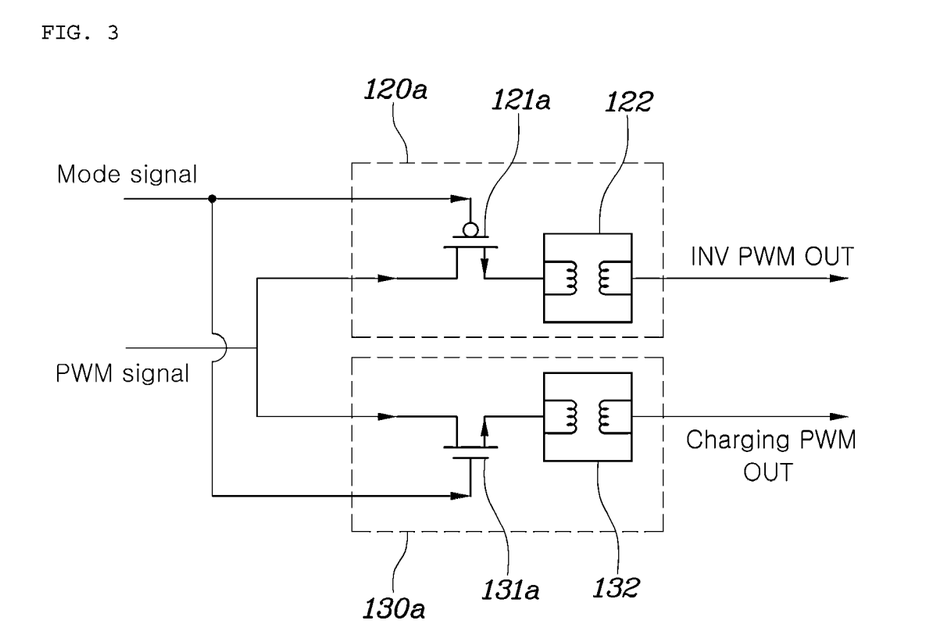
FIG. 3 is a block diagram showing an embodiment of a first gate driving circuit and a second gate driving circuit in the inverter driving part shown in FIG. 2 in detail.

FIG. 3 is a block diagram showing an embodiment of a first gate driving circuit and a second gate driving circuit in the inverter driving part shown in FIG. 2 in detail.

Referring to FIG. 3, a first gate driving circuit 120a may include a switch 121a and a transformer 122. The switch 121a transmits or blocks the PWM signal on the basis of the mode signal and the transformer 122 convert-outputs the PWM signal transmitted by the switch 121a and provides insulation between the switch 121a and the gate resistor R1.

Similarly, a second gate driving circuit 130a may include a switch 131a and a transformer 132. The switch 131a transmits or blocks the PWM signal on the basis of the mode signal and the transformer 132 convert-outputs the PWM signal transmitted by the switch 131a and provides insulation between the switch 131a and the gate resistor R2.

In the embodiment in FIG. 3, when the controller 110 outputs "0 (low)" in the motor driving mode and outputs "1 (high)" in the charging mode, the switch 121a of the first gate driving circuit 120a is realized with P-MOSFET, so the switch 121a is short-circuited in the motor driving mode and is open-circuited in the charging mode. The switch 131a of the second gate driving circuit 130a is realized with N-MOSFET, so that the switch 131a is open-circuited in the motor driving mode and is short-circuited in the charging mode. The switch 121a of the first gate driving circuit 120a and the switch 131a of the second gate driving circuit 130a are operated to be complementary to each other.

In the motor driving mode, the switch 121a is short-circuited and the switch 131a is open-circuited. Therefore, the gate the driving signal is output to the first gate resistor R1 through the transformer 122 of the first gate driving circuit 120a and the switching circuits S1 to S6 are operated.

In the charging mode, the switch 121a is open-circuited and the switch 131a is short-circuited. Therefore, the gate the driving signal is output to the second gate resistor R2 through the transformer 132 of the second gate driving circuit 130a, and the switching circuits S1 to S6 are operated.

Therefore, in the motor driving mode, the relatively small resistance value due to the resistor R1 is applied to the gate of the switching elements S1 to S6, whereby the high speed switching of the switching elements is possible. In the charging mode, the relatively resistance value is applied to the gate of the switching elements S1 to S6 by the resistor R2. Therefore, the switching speeds of the switching elements decrease, whereby the noise occurrence may be suppressed.

In the embodiment shown in FIG. 3, the first gate driving circuit 120a has P-MOSFET, and the second gate driving circuit 130a has N-MOSFWT, but the configurations thereof will be changed to each other in response to setting of the mode signal.

Figure 4:
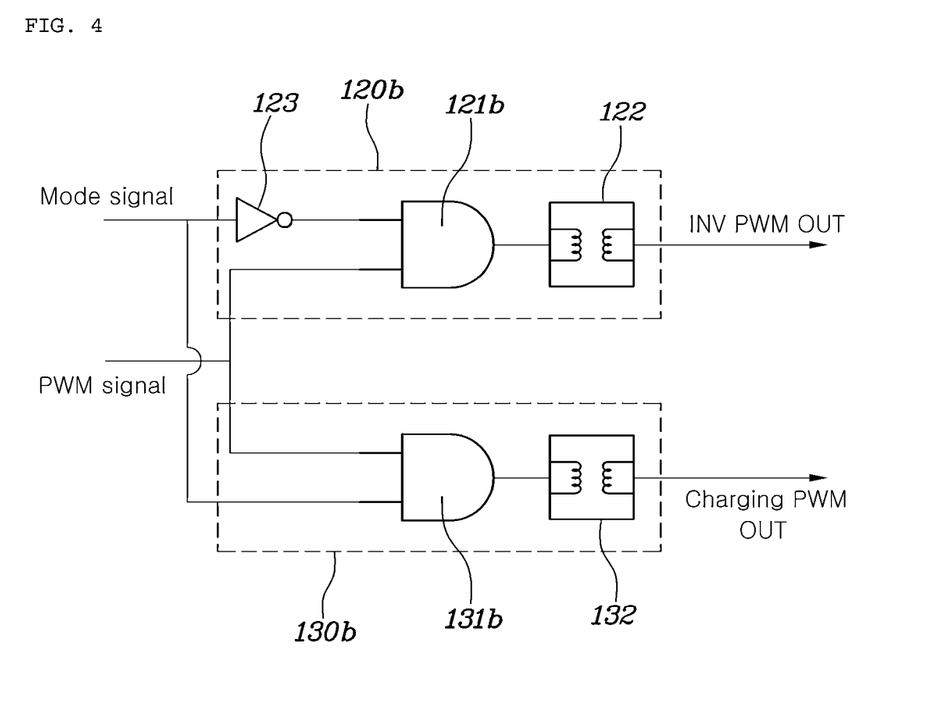
FIG. 4 is a block diagram showing another embodiment of the first gate driving circuit and the second gate driving circuit in the inverter driving part shown in FIG. 2 in detail.

FIG. 4 is a block diagram showing another embodiment of the first gate driving circuit and the second gate driving circuit in the inverter driving part shown in FIG. 2 in detail.

Referring to FIG. 4, a first gate driving circuit 120b may include an inversion element 123, an OR element 121b, and the transformer 122. The inversion element 123 inverts the mode signal, the OR element 121b receives output of the inversion element 123 and the PWM signal, and the transformer 122 convert-outputs the PWM signal transmitted by the OR element 121b and provides insulation between the OR element 121b and the gate resistor R1.

The second gate driving circuit 130b may include an OR element 131b and the transformer 132. The OR element 131b receives the mode signal and the PWM signal, and the transformer 132 convert-outputs the PWM signal transmitted by the OR element 131b and provides the insulation between the OR element 131b and the gate resistor R2.

In the embodiment shown in FIG. 4, when the controller 110 outputs "0 (Low)" in the motor driving mode and outputs "1 (High)" in the charging mode, the inversion element 123 of the first gate driving circuit 120b outputs "1" in the motor driving mode, and the first OR element 121b of the first gate driving circuit 120b continues to receive "1" as a single input from the inversion element 123. Therefore, the first OR element 121b of the first gate driving circuit 120b outputs the PWM signal to the transformer 122 as it is. The OR element 131b of the second gate driving circuit 130b continues to receive "0" as a single input and thus continues to output "0".

Accordingly, in the motor driving mode, the switching circuits S1 to S6 are operated as the gate the driving signal corresponding to the PWM signal is output to the first gate resistor R1 by the transformer 122 of the first gate driving circuit 120b.

In the charging mode, the inversion element 123 of the first gate driving circuit 120b outputs "0", so that the first OR element 121b of the first gate driving circuit 120b continues to output "0" as a single output. The OR element 131b of the second gate driving circuit 130b continues to output "1" as a single output, so that the OR element 131b the PWM signal to the transformer 132 as it is.

Accordingly, in the charging mode, the switching circuits S1 to S6 are operated as the gate driving signal corresponding to the PWM signal is output to the second gate resistor R2 through the transformer 132 of the second gate driving circuit 130b.

In the embodiment of FIG. 4, the inversion element 123 is provided in the first gate driving circuit 120b. However, the configuration may be changed such that the inversion element 123 is provided in the second gate driving circuit 130b in response to the setting of the mode signal.

Figure 5:
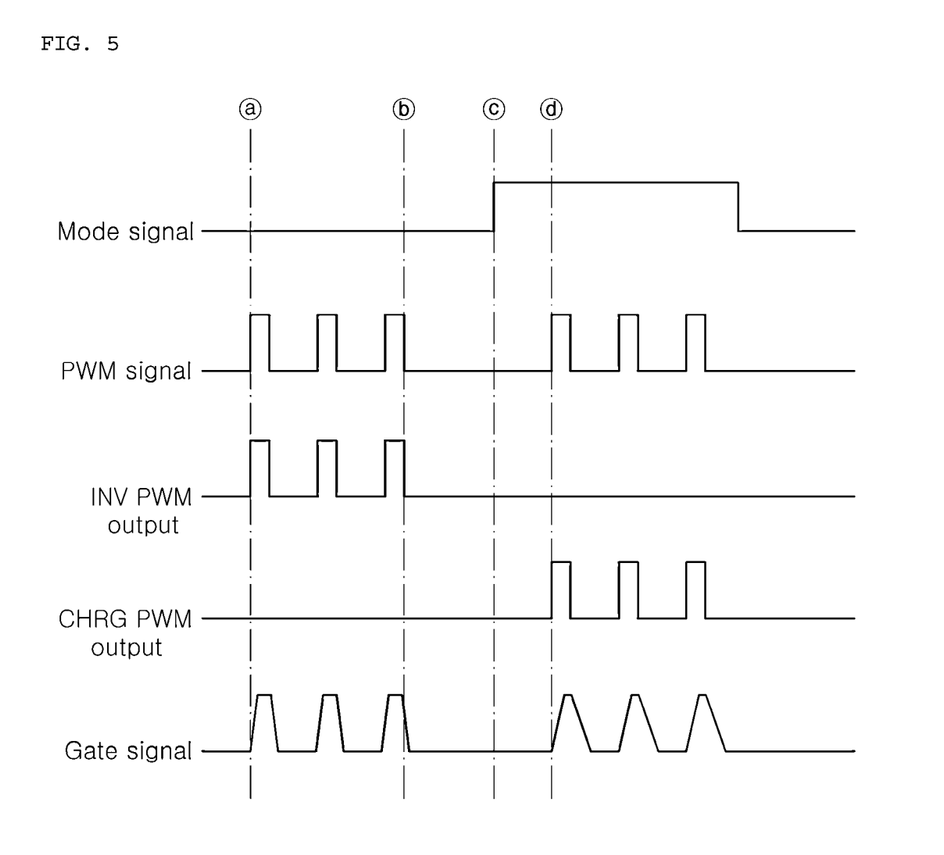
FIG. 5 is a time graph showing an operational example of the charging system using a motor driving system according to the embodiment of the present disclosure.

FIG. 5 is a time graph showing an operational example of the charging system using a motor driving system according to the embodiment of the present disclosure.

Referring to FIG. 5, in an initial state for driving a vehicle, when the controller 110 outputs the mode signal as "0" like as at point (a), the PWM signal (INT PWM output) is supplied to the first gate resistor R1 through the first gate driving circuit 120, so that the switching elements S1 to S6 are switched. In the above case, the gate signal is supplied to the switching elements through the gate resistor R1 with a relatively small resistance value. Therefore, the motor driving with low loss may be achieved.

In FIG. 5, when a driver ends driving of the vehicle at point (b) and connects the charging equipment to the vehicle for the charging at point (c), the controller 110 converts the mode signal into "1" and outputs the converted signal. At point (d), the PWM signal is applied to the second gate resistor R2 through the second gate driving circuit 30, and the gate signal is supplied to the switching elements through the gate resistor R2 with a relatively greater resistance value, whereby the noise generation due to the switching of the switching elements is reduced.

As shown in FIG. 5, when a first gate signal and a second gate are compared with each other, the first gate signal (the gate signal generated between point (a) and point (b)) being generated through the first gate driving circuit 120 and the first gate resistor, and a second gate signal (gate signal generated point (d)) being generated through the second gate driving circuit 130 and the second gate resistor, an absolute value of an ascending-descending inclination of the second gate signal has a value smaller than an absolute value of an ascending-descending inclination of the first gate signal. Therefore, it may be seen that relatively slower switching is achieved.

The present disclosure provides a charging method realized using the charging system as described above.

Figure 6:
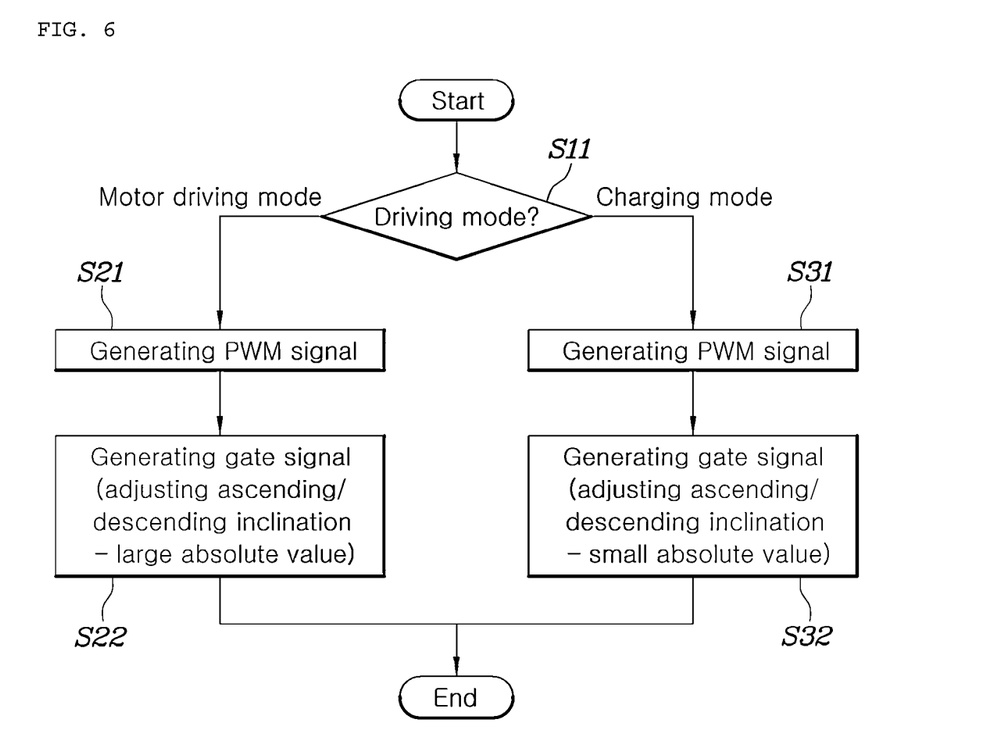
FIG. 6 is a flowchart showing a charging method for using a motor driving system according to the embodiment of the present disclosure.

FIG. 6 is a flowchart showing a charging method for using a motor driving system according to the embodiment of the present disclosure.

As shown in FIG. 6, according to the embodiment of the present disclosure, the charging method using the motor driving system may start from determining, by the controller 110 of the inverter driving part 100, the driving mode of the switching elements in the inverter 30 by receiving the vehicle driving condition information (charging or driving states) at S11.

In the determining whether in the driving mode at S11, the vehicle driving mode is determined as the motor driving mode in which the D.C. voltage is converted into the A.C. voltage and then supplied to the motor to drive the motor. At this point, the controller 110 outputs the PWM signal and the mode signal, so that the signal may be generated by the first gate driving circuit 120.

The controller 110 may generate and output the PWM signal at S21, output the mode signal to allow the first gate driving circuit 120 to output the PWM signal, and allow the output PWM signal to be supplied to the switching elements S1 to S6 through the gate resistor R1 with the relatively small resistance value at S22.

The gate signal generated by passing S21 and S22 has an ascending edge and a descending edge with a relatively large absolute value of the inclination, whereby the relatively high-speed switching of the switching elements is possible.

In the determining whether in the driving mode at S11, the vehicle driving mode is determined as the charging mode in which the D.C. charging power is supplied to the neutral point of the motor and the D.C. charging power is converted to charge the battery. In this mode, the controller 110 outputs the PWM signal and the mode signal, so that the signal may be generated by the second gate driving circuit 130.

The controller 110 may generate and output the PWM signal at S31, output the mode signal to allow the second gate driving circuit 130 to output the PWM signal, and allow the output PWM signal to be supplied to the switching elements S1 to S6 through the gate resistor R1 with the relatively large resistance value at S32.

The gate signal generated by passing S31 and S32 has an ascending edge and a descending edge with a relatively small absolute value of the inclination, whereby the relatively low-speed switching of the switching elements is possible.

The controller 110 may include a processor or a microprocessor. Optionally, the controller 110 may also include a memory. The aforementioned operations/functions of the controller 110 can be embodied as computer readable code/algorithm/software stored on the memory thereof which may include a non-transitory computer readable recording medium. The non-transitory computer readable recording medium is any data storage device that can store data which can thereafter be read by the processor or the microprocessor. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The processor or the microprocessor may perform the above described operations/functions of the controller 110, by executing the computer readable code/algorithm/software stored on the non-transitory computer readable recording medium.

As described above, according to the various embodiments of the present disclosure, the charging system using a motor driving system may minimize switching loss by increasing switching speed of the switching elements in the inverter during the motor driving, and may reduce the noise due to the switching by reducing the switching speed of the switching elements in the inverter during the charging.

Accordingly, during the charging, an adverse effect of noise on communication achieved between the vehicle and the charging equipment through PLC communication may be eliminated, and efficient charging may be achieved.

Although the preferred embodiments of the present disclosure have been disclosed for illustrative purposes, those skilled in the art will appreciate that various modifications, additions and substitutions are possible, without departing from the spirit and scope of the present disclosure.

What is claimed is:

1. A charging system using a motor driving system, the charging system comprising:
    a battery;
    an inverter to which D.C. power stored in the battery is applied, the inverter comprising a plurality of legs each comprising two switching elements connected to each other in series;
    a motor comprising a plurality of coils of which first ends are respectively connected to connection nodes of the switching elements included in each of the plurality of legs, and second ends are connected to each other to form a neutral point; and
    an inverter driving part configured to control switching of the switching elements to provide different switching speeds of the switching elements for a motor driving mode operated for controlling the switching elements in the inverter for driving the motor and a charging mode operated for controlling the switching elements in the inverter so as to change magnitude of charging voltage supplied to the neutral point of the motor and to output the charging voltage to the battery, wherein the inverter driving part is configured to determine that the switching speeds of the switching elements in the charging mode are slower than the switching speeds of the switching elements in the motor driving mode.

2. The charging system of claim 1, wherein each of the switching elements is a switching element comprising a gate to which a driving signal that determines the switching is applied, and the inverter driving part is configured to determine magnitude of a gate resistance applied to the gate differently for each of the charging mode and the motor driving mode.

3. The charging system of claim 2, wherein the inverter driving part comprises:

a controller configured to generate a mode signal for representing one of the charging mode and the motor driving mode and a pulse width modulation signal for controlling the switching of the switching elements;

a first gate driving circuit configured to output a signal corresponding to the pulse width modulation signal in the motor driving mode;

a second gate driving circuit configured to output a signal corresponding to the pulse width modulation signal in the charging mode;

a first gate resistor connected to a portion between an output terminal of the first gate driving circuit and the gate; and a second gate resistor connected to a portion between an output terminal of the second gate driving circuit and the gate, and having a resistance value larger than a resistance value of the first gate resistor.

4. The charging system of claim 3, wherein the first gate driving circuit comprises a first switch configured to transmit or block the pulse width modulation signal on the basis of the mode signal, and a first transformer providing insulation between the first switch and the first gate resistor, the second gate driving circuit comprises a second switch configured to transmit or block the pulse width modulation signal on the basis of the mode signal, and a second transformer providing insulation between the second switch and the second gate resistor, and the first switch and the second switch are operated to be complementary to each other.

5. The charging system of claim 4, wherein the first switch is a P-MOSFET and the second switch is an N-MOSFET, or the first switch is an N-MOSFWT and the second switch is the P-MOSFET.

6. The charging system of claim 3, wherein the first gate driving circuit comprises a first OR element configured to receive one of the mode signal and an inversion signal of the mode signal and to receive the pulse width modulation signal, and a first transformer providing insulation between the first OR element and the first gate resistor, the second gate driving circuit comprises a second OR element configured to receive one of the mode signal and the inversion signal of the mode signal and to receive the pulse width modulation signal, and a second transformer providing insulation between the second OR element and the second gate resistor, and one of the first gate driving circuit and the second gate driving circuit comprises an inversion element inverting the mode signal.

7. The charging system of claim 3, wherein the controller is configured to receive vehicle driving condition information indicating whether a vehicle is in the motor driving mode or the charging mode to generate the mode signal for representing the charging mode or the motor driving mode.

8. A charging method using a motor driving system, the charging method comprising:

determining, by a controller, an operation mode as one of a motor driving mode and a charging mode, the motor driving mode being operated for driving a motor by controlling switching elements in an inverter to change D.C. voltage into A.C. voltage and supplying the A.C. voltage to the motor, and the charging mode being operated for charging a battery by controlling the switching elements in the inverter to change magnitude of charging voltage supplied to a neutral point of the motor and to output the charging voltage to the battery connected to the inverter;

generating, by the controller, a pulse width modulation signal provided for controlling the switching elements; and adjusting, by the controller, in a gate driving circuit, an ascending inclination and a descending inclination of the pulse width modulation signal generated in response to the determined operation mode, generating a gate signal, and providing the gate signal to gates of the switching elements, wherein switching speeds of the switching elements in the charging mode are slower than switching speeds of the switching elements in the motor driving mode.

9. The charging method of claim 8, wherein the inverter, to which D.C. power stored in the battery is applied, comprises a plurality of legs each comprising two switching elements connected to each other in series;

the motor comprises a plurality of coils of which first ends are respectively connected to connection nodes of the switching elements included in each of the plurality of legs, and second ends are connected to each other to form the neutral point; and in the motor driving mode, the D.C. power is changed into A.C. power of a plurality of phases by switching of the switching elements, and the A.C. power is supplied to the motor, and in the charging mode, the charging voltage supplied to the neutral point of the motor is boosted by a boost converter including one of the coils of the motor and the two switching elements in one leg connected to the one coil, and then is supplied to the battery.

10. The charging method of claim 8, wherein in the providing the gate signal, an inverter driving part determines that an absolute value of an ascending inclination and a descending inclination of the gate signal in the charging mode is less than an absolute value of the ascending inclination and the descending inclination of the gate signal in the motor driving mode.

11. The charging method of claim 8, wherein in the providing the gate signal, an inverter driving part determines magnitude of a gate resistance applied to the gate differently for each of the charging mode and the motor driving mode.

12. The charging method of claim 8, further comprising:

receiving, by the controller, vehicle driving condition information indicating whether a vehicle is in the motor driving mode or the charging mode so that the controller generates the mode signal for representing the charging mode or the motor driving mode.

* * * * *